June 9, 1953

N. E. REYNOLDS ET AL 2,641,099

BEET TOPPER

Filed April 19, 1946

FINDER LEVEL
MIDPLANE
RIDGE LEVEL

INVENTORS
Nelson E. Reynolds
Leon R. McRobert
Carlson Pitzner Hubbard & Wolfe
ATTORNEYS

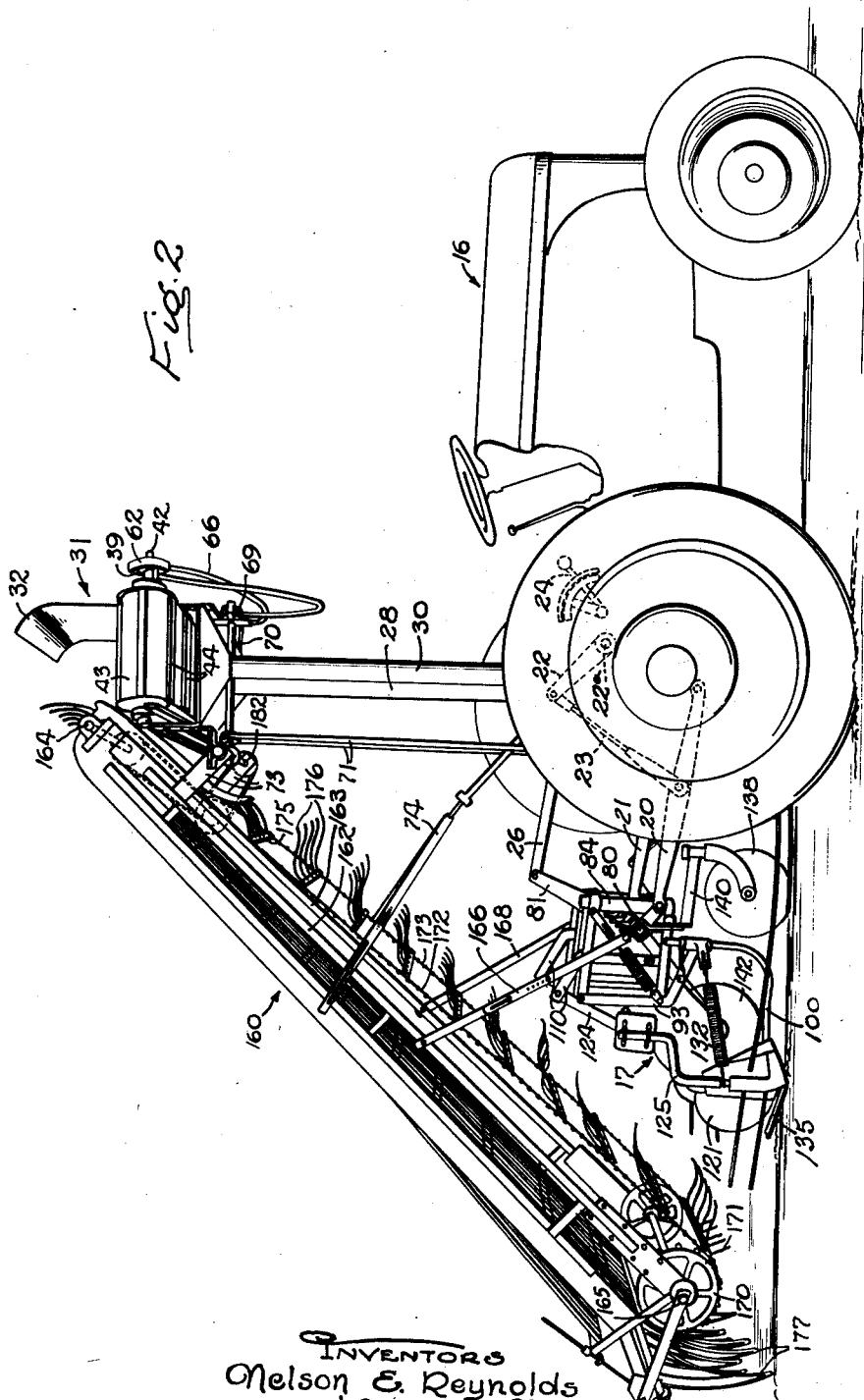

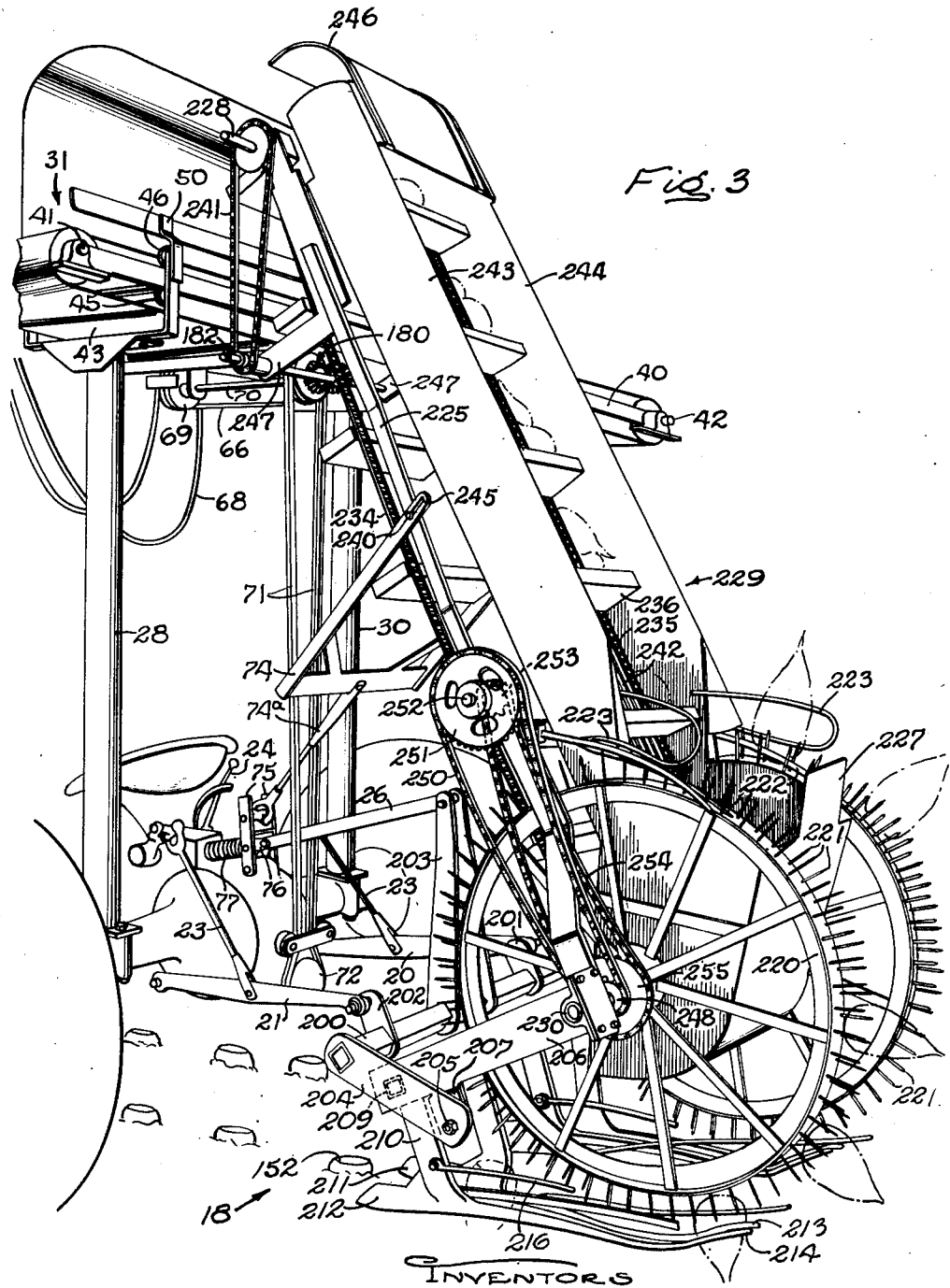

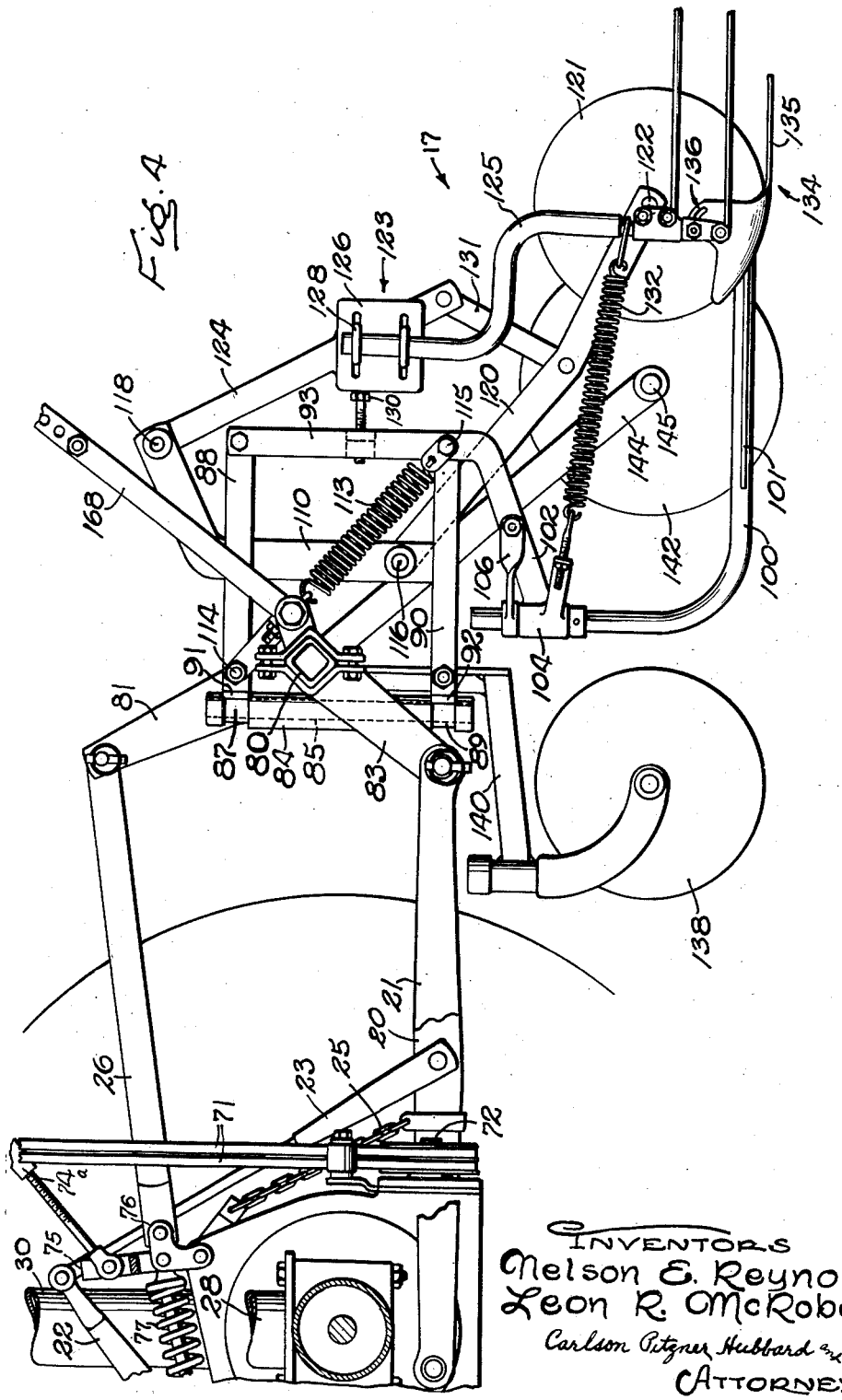

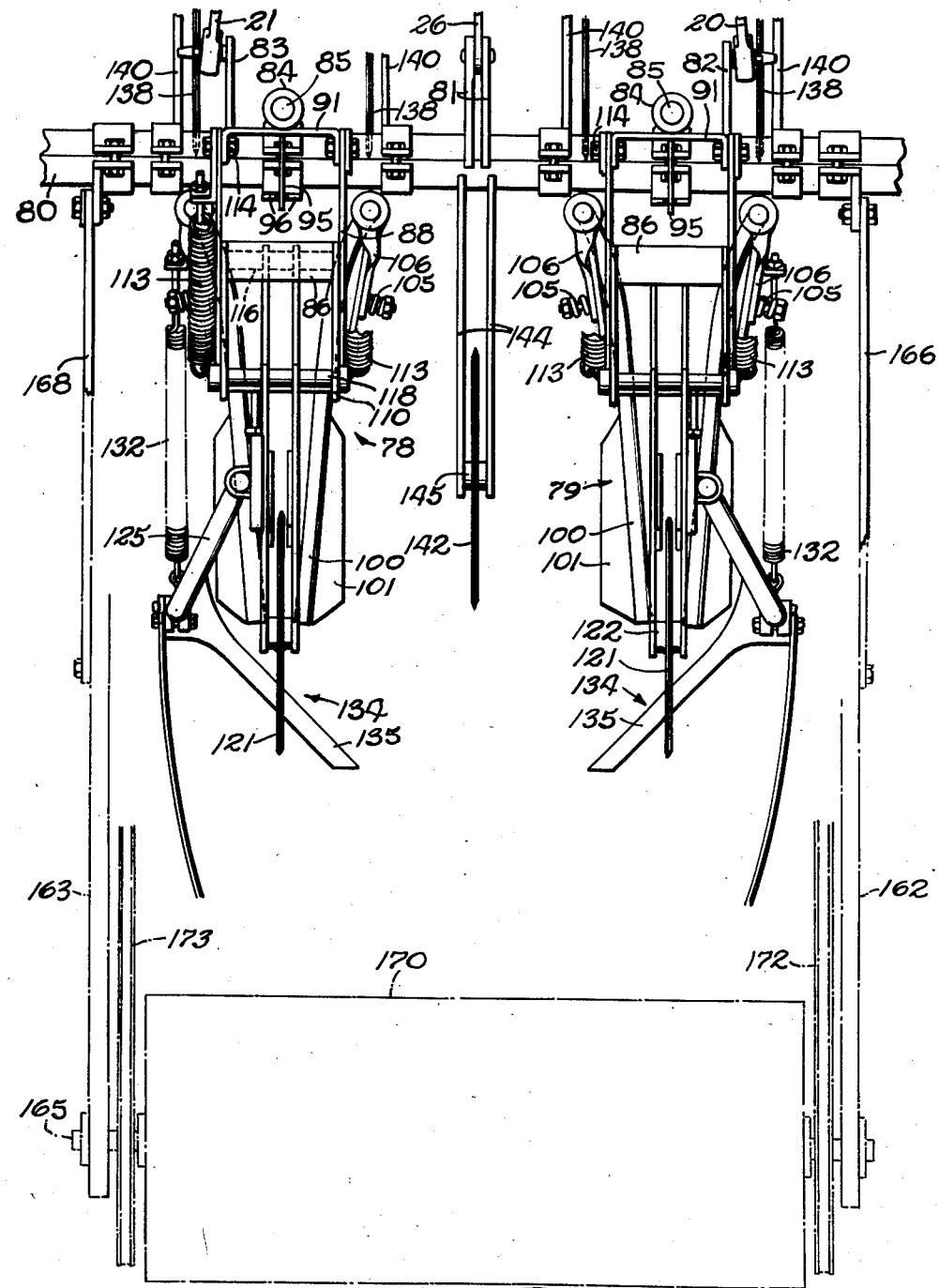

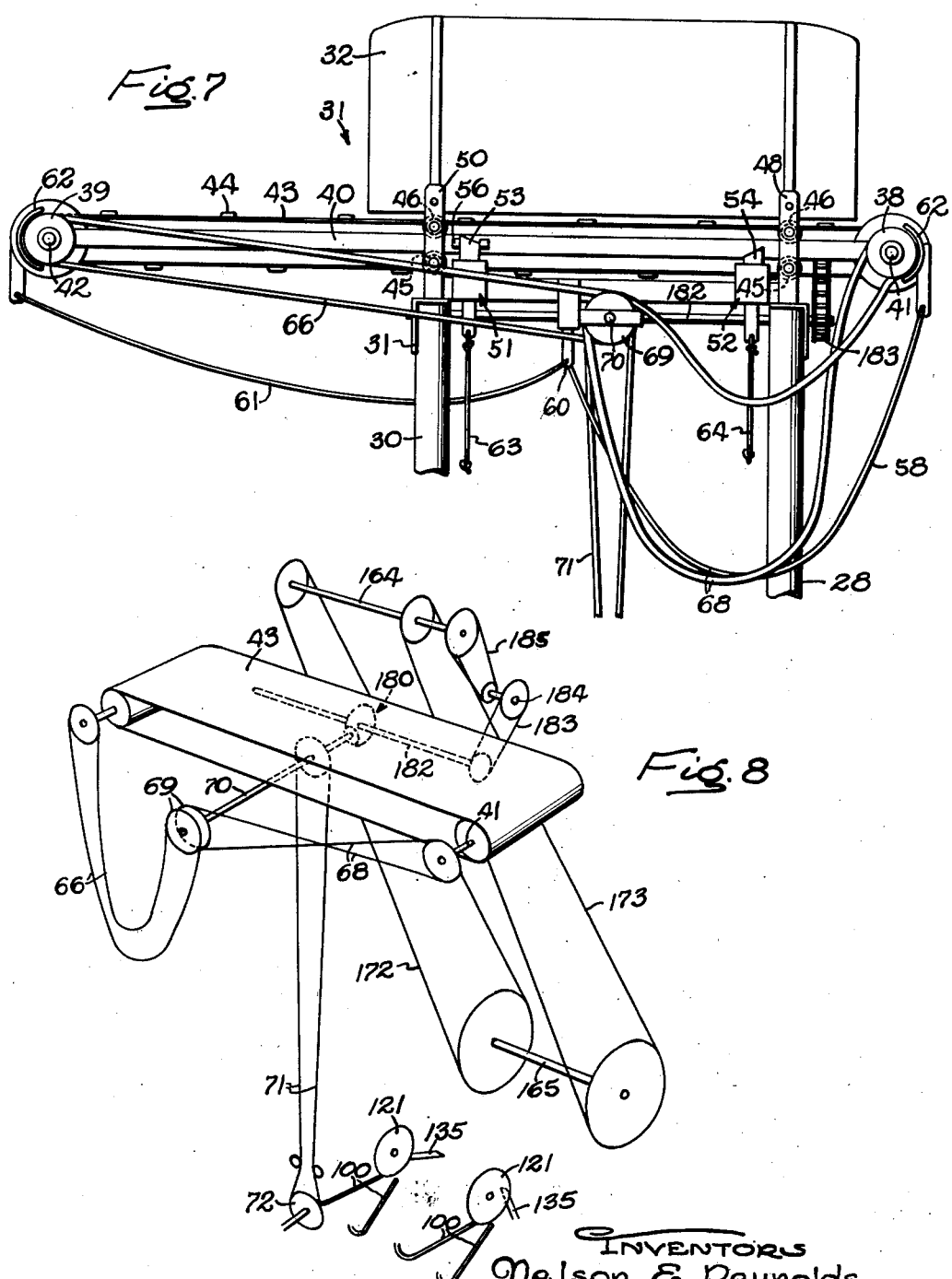

| TABLE SHOWING LOCATION OF KNIFE RELATIVE TO FINDER FOR VARIOUS BEET SIZES (FOR VERTICAL RATIO 1.4:1) ||||||||
|---|---|---|---|---|---|---|
| GREATEST BEET DIAMETER | BEET RADIUS | LAG ON CENTER LINE | CROWN CURVE ADVANCE ON CENTER LINE | GAP REQUIRED ON CENTER LINE | BEET HEIGHT ABOVE MIDPLANE | CROWN THICKNESS |
| 1.0 | 0.5 | 0.21 | 0.00 | 0.71 | 0.80 | 0.68 |
| 2.0 | 1.0 | 0.42 | 0.00 | 1.42 | 1.58 | 0.91 |
| 3.0 | 1.5 | 0.63 | 0.06 | 2.07 | 2.38 | 1.14 |
| 4.0 | 2.0 | 0.84 | 0.10 | 2.74 | 3.19 | 1.37 |
| 5.0 | 2.5 | 1.05 | 0.14 | 3.41 | 3.98 | 1.60 |
| 6.0 | 3.0 | 1.26 | 0.18 | 4.10 | 4.77 | 1.88 |
| 7.0 | 3.5 | 1.44 | 0.23 | 4.71 | 5.55 | 2.06 |

INVENTORS
Nelson E. Reynolds
Leon R. McRobert
Carlson Pitzner Hubbard & Wolfe
ATTORNEYS

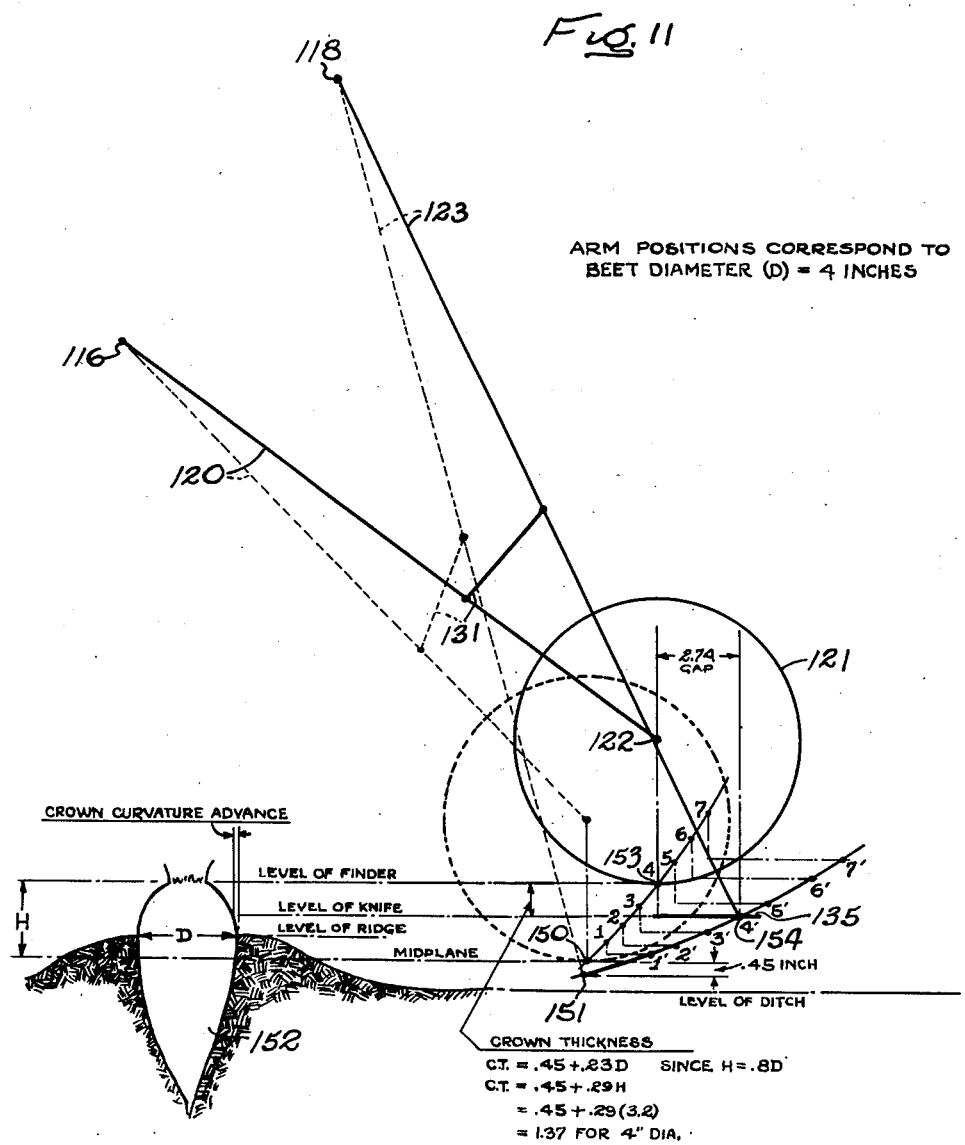

Patented June 9, 1953

2,641,099

UNITED STATES PATENT OFFICE 2,641,099

BEET TOPPER

Nelson E. Reynolds and Leon R. McRobert, Greeley, Colo., assignors to Harry Ferguson, Inc., Detroit, Mich., a corporation of Delaware Application April 19, 1946, Serial No. 663,512

9 Claims. (Cl. 56—121.46)

This invention relates to a method of and means for harvesting beets. More particularly it is concerned with beet harvesting equipment adapted to remove the tops of beets and, after a replacement of a portion of the apparatus, to remove the topped beets from the earth.

Attempts have been made over a long period of years to provide harvesting apparatus enabling the harvesting of beets in a manner completely satisfactory to the beet growers. The fact that the major share of sugar beets have, in spite of such attempts, continued to be harvested largely by hand is evidence of the fact that no machine satisfactory to the beet grower has been developed. In addition to the mechanical shortcomings of prior beet topping and digging apparatus, there has been a lack of full appreciation in the art that the beet tops or foliage is a valuable crop which should be harvested and immediately removed from contact with the earth or other source of contamination for subsequent use as a stock feed of high food value. Judging by prior art devices, there has also been a failure to consider the removing and retrieving of the beet tops and subsequent removal and retrieving of the beets as a double harvesting operation which may be economically accomplished by the use of the two separate attachments in association with a basic conveying-supporting mechanism employed in both the topping and digging operations.

With regard to the topping of the beets, the desirability of "in place" topping has been recognized but no machine thus far developed has been found in practice to be founded on principles offering a completely satisfactory solution to the problem. Prior machines, particularly when used over somewhat irregular beet fields are undependable, easily jammed and generally erratic in operation. For example, in the case of a large portion of the beets, too little crown may be removed thereby increasing the "tare" and reducing the price which the beets should command on the market. If, as occurs frequently, too great a portion of the top of the beet is removed, this obviously results in a tonnage loss in the beets than can be gathered from a single acre. It has been common experience in the use of beet topping machines that beets are pushed over, broken, and inefficiently cut and removed from the earth.

It is not difficult to see why such maloperation has been prevalent. In topping beets, it is necessary to properly gauge them to determine the line of cut and such gauging generally has heretofore been effected with reference only to the beet being topped and without reference to the ditch or ridge level. It has been found that for accurate topping, the crown thickness to be removed from any beet must be determined with reference to some gauge level. For accurate gauging, however, the ground surfaces nearest the beets are not suitable because the ditches are uneven and vary in depth from field to field. Moreover, if the field is on a slope, erosion frequently washes a ditch deep at one end, filling it up level at the other. The ridges too are uneven both from natural causes and from the practice of some growers to throw dirt in around the stems to cause a concentrated stem growth. Additional difficulties arise from the fact that the beets may be located several inches to either side of the actual center line of the row, either because of inaccurate planting or displacement due to the subsequent tillage. Further, in harvesting, the extremely dense foliage peculiar to sugar beets tends to clog or jam various portions of the mechanism. The lower leaves particularly, which are fibrous and ropy when somewhat wilted, interfere with the desired operation of the device.

It is the main object of the present invention to provide new and improved apparatus adapted to a novel method of harvesting which includes the cutting and retrieving of the beet tops and the subsequent digging and retrieving of the beets.

It is an object of the invention to produce a beet harvesting mechanism which is simple, economical to operate and will give consistent results under adverse field conditions.

It is another object of our invention to provide means for gauging automatically and accurately the correct amount of crown to be sliced from any beet regardless of its diameter or height above the ground level.

It is a further object of our invention to supply means in combination with the beet topper for determining a mean or artificial ground level for use as a gauging reference plane.

Still another object is to provide a simplified mechanism which employs a finder for gauging the height of the beet and a beet topping knife so constructed and interconnected by linkage that the movements of the finder and the knife, both vertically and horizontally, will be according to certain definite and predetermined requirements.

A still further object of the invention is to employ cutting means effective to produce a slicing action for cleanly severing the beet with a minimum tendency to produce breakage or displacement of the beet regardless of type of soil and under widely varying moisture conditions.

It is yet another object of the invention to produce means for centering the gauging and cutting mechanism upon individual beets to enable uniformly efficient topping in spite of beet misalignment.

It is an additional object of this invention to provide for the gauging and topping of either small or large beets with no tendency on the part of the gauging mechanism to override the smaller beets or underride the larger beets and thus cause inaccurate topping or beet breakage.

It is an object of this invention to provide beet harvesting equipment which has a minimum tendency to jam or otherwise to be affected by the dense foliage peculiar to sugar beets.

It is a further object of the invention to employ novel structure for use in association with a power lift device and a plow for digging beets whereby the plow is elevated for transportation in a manner to produce a large margin of ground clearance and to provide maximum protection from damage.

It is a still further object of the invention to provide a conveyor adapted particularly for transverse mounting on a farm vehicle which is adapted for discharging conveyed material on either side of the vehicle.

It is still another object of our invention to employ structure associated with a digging plow and conveyor such that transport of beets into engagement with the conveyor is accomplished in a uniform manner for all depths to which the digging plow may be adjusted.

Further objects and advantages of the invention will become apparent as the following description proceeds, taken in connection with the accompanying drawings, in which—

Fig. 2 is a general view showing the topper attachment and loading mechanism used in conjunction with the device shown in Fig. 1.

Fig. 3 is a perspective view of the digger attachment and elevator showing the method of association with the tractor and transverse conveyor.

Fig. 4 is an enlarged view in elevation setting forth the details of the topper unit of Fig. 2.

Fig. 6 is a plan view including structural details of the mechanism shown in Figs. 4 and 5 with certain parts broken away.

Fig. 7 is a more detailed view in elevation of the conveyor mechanism with parts broken away.

Fig. 8 discloses the power transfer scheme for driving the loading and conveying apparatus from the power take-off of the tractor.

Figures 9, 10:
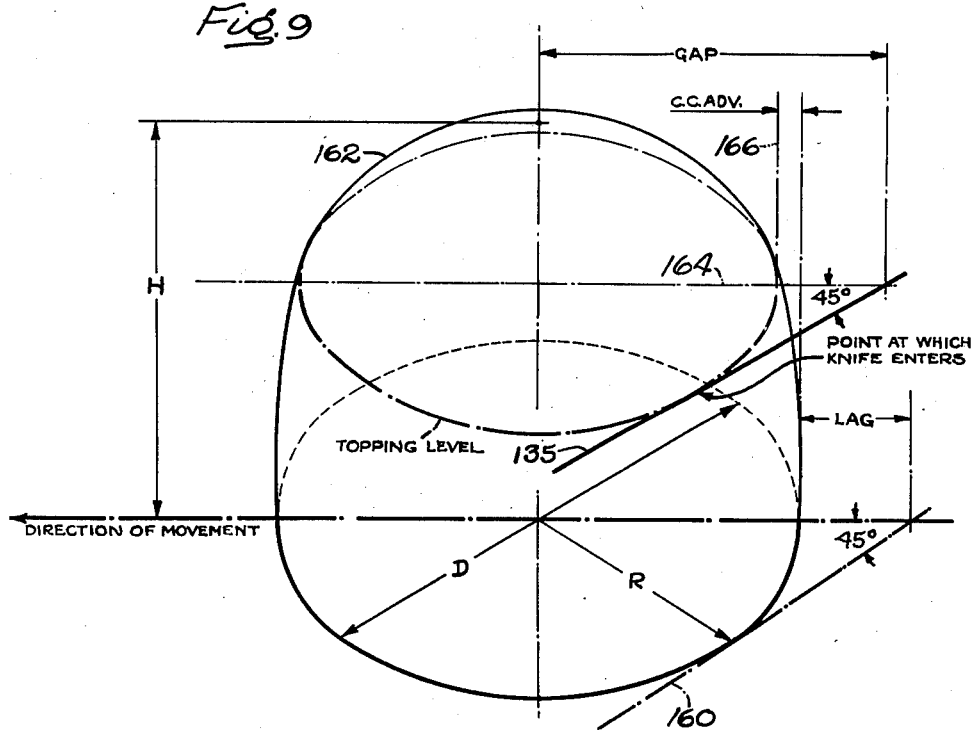

Fig. 9 shows the method of geometrical construction employed to determine the proper horizontal "gap" between the finder and knife.

Fig. 10 is a table outlining the proper space relationship between the finder and knife under a given set of assumed conditions.

Fig. 11 is a diagrammatic representation of a simplified linkage following a law of operation as determined by the data included in the table of Fig. 10.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Prior to a description of the novel apparatus which we employ, it will be helpful to set out the more basic requirements of a satisfactory beet harvesting device. It will then become apparent as the discussion proceeds that the harvester which we have produced is inherently able to satisfy these requirements.

The first requirement of beet harvesting is that the harvested crop be fully utilized and that harvesting be performed in a manner such that the crop will be of maximum value to the grower.

A second requirement is that the harvesting shall be completed in a minimum of time and with a minimum expenditure of manpower.

A more specific requirement relates to the level of topping, in other words the determination according to beet size of the desirable thickness of the crown to be severed. It has been considered desirable to have the small beets cut at the lowest leaf scar line, and in large beets it is desired that such cutting take place about three-fourths of an inch below the lowest leaf scar line. Investigation carried out under the supervision of the University of California, which resulted in a large amount of data, has shown that the proper rise of the finder with respect to the knife should follow the ratio 1.4:1.0. Under certain circumstances where it is desirable to produce a thinner crown, ratios of 1.3:1.0, 1.2:1.0 and even smaller ratios may be used. Correlative with the above it has been observed that as beets grow they increase in height above the field (as of at planting time) in a rather close relationship to their greatest diameter, the average height of the beet crown being about 80% of the greatest beet diameter. If, as in irrigated territories, the field is furrowed out or "ditched" an average beet will grow in this same ratio of dimensions relative to the "midplane" level between the ditch bottom and the row crown top since substantially the dirt removed from the ditches between the rows has been deposited around the growing beets to form a ridge. The term "mid-plane," which is also used elsewhere herein, is defined as an artificial reference plane at a level midway between the ditch bottom and the ridge top. That the above data may be incorporated in a relationship which may in turn be utilized to control in part the operation of novel beet topping mechanism will be more fully covered later in the discussion.

Another more specific requirement of beet harvesting is that the beet top or foliage not only should be salvageable but should actually be harvested and kept free of dirt, thereby producing a stock feed of high food value. Further, the beet roots should be dug and loaded with a maximum of efficiency and a minimum of damage.

A still further requirement resides in the desirability of reducing both the complexity and amount of equipment required to perform the complete harvesting operation. Closely allied with this is the requirement for maximum portability over various types of terrain to the harvesting location.

Three basic units are employed in our beet harvesting apparatus. The first is a conveying-supporting unit 15 fixed on the tractor 16 (Fig. 1) which is consecutively associated with a topping attachment or unit 17 (as in Fig. 2) and a digging attachment or unit 18 (as in Fig. 3), as required by the process of harvesting. Both the topping and digging attachments disclosed are capable of harvesting the beets in two adjacent rows simultaneously. This feature enables two passes to be made over the field, the first for topping, the second for digging, in the same time or less time than would be required by a beet harvester in which the topping, digging and retrieving of the beets from a single row is accomplished by a single harvesting assembly.

The specific tractor 16 here shown will be recognized by those skilled in the art as a familiar light-weight agricultural tractor equipped with a hitch linkage of the type disclosed in the Henry George Ferguson Patent No. 2,118,180 issued May 24, 1938. As the discussion proceeds, it will be apparent that the use of the "Ferguson Hitch" enables a number of important advantages inherent in this type of hitch to be realized. Among these advantages may be included the stability provided by the upper and lower links of the Ferguson hitch, such links enabling the topper or digger devices to become a structural unit with the tractor. In addition, the Ferguson hitch enables the level of the harvesting devices to be readily adjusted with respect to the vehicle. With the vehicle and harvesting devices in a predetermined vertical relationship the necessity for gauge wheels to engage the ground is eliminated, the vehicle itself being substituted therefor. In the case of the digger unit, automatic vertical adjustment of the digger element is determined by the reactive forces acting in compression on the upper link. Movement of a manual control on the other hand enables either harvesting unit to be raised clear of the ground for purposes of transportation. We wish it understood, however, that the harvesting apparatus and method which we disclose is not in any way restricted to use with the Ferguson type of hitch and, as will appear to those skilled in the art, the harvester disclosed may also be used with other types of tractors.

Conveying-supporting unit

The conveying-supporting unit serves to remove the harvested crop (either tops or roots) to such a collecting means as a wagon or trailer accompanying the harvester, as well as to provide support for either of the other units.

Figures 1, 5:
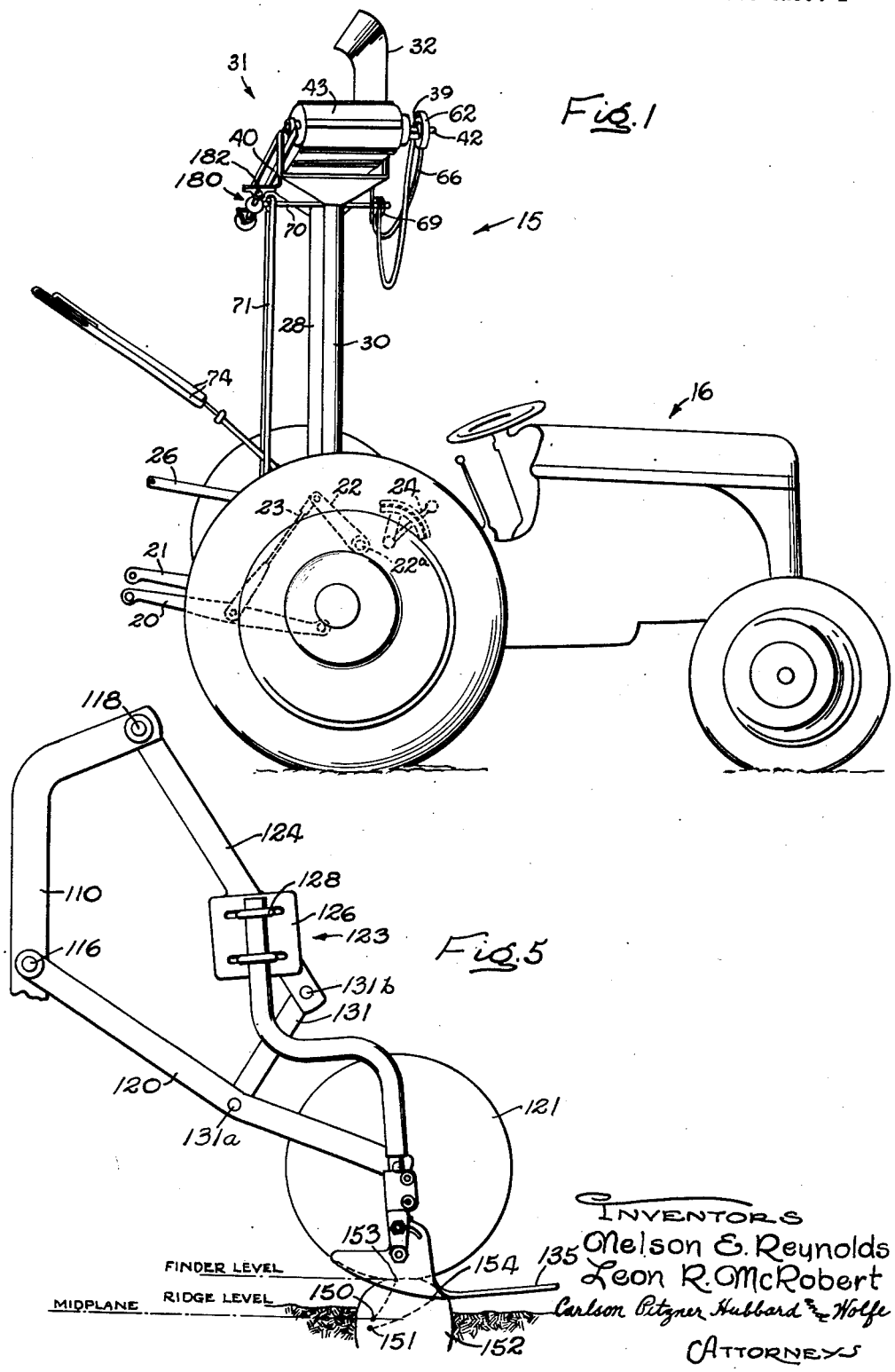
Figure 1 shows a tractor equipped with vertical supporting members and transverse conveyor mechanism embodied in one unit of our invention.
Fig. 5 is a simplified view of the finder and topper linkage of Fig. 4 showing the knife in the raised position immediately prior to the topping of a beet.

As illustrated in Fig. 1, this unit in its exemplary form consists of a conveyor and conveyor-support together with couplings to engage either the topper unit or the digger unit. The Ferguson hitch includes a lower pair of laterally spaced draft links 20, 21 pivoted at their forward ends beneath and forward of the tractor's rear axle. These links are suspended by drop links 23 from cranks 22 rigid with a rock shaft 22a. The latter is oscillated by a hydraulic ram (not shown) as is customary in the system of Ferguson Patent No. 2,118,180. For the present, suffice it to say that pressure fluid may be admitted to or exhausted from the ram under the control of a main control valve (not shown) operable by a quadrant lever 24 to raise and lower the links 20, 21. Moreover, compression on a third or top link 26 serves to rock a rocker arm or shackle 76 (Fig. 4) forward against the bias of a control spring 77 and effect an exhaust of fluid from the ram, all in a manner to retain automatically a constant compressive force in the control spring.

Mounted near the rear of the tractor, preferably over the rear axle, are upright supporting columns 28 and 30 which for the sake of convenience may be mounted on the tractor utilizing the bolts normally employed to mount the fenders of the vehicle. Spanning the top of the upright support is a transverse horizontal conveyor indicated generally by the numeral 31. This conveyor is arranged to be translated either to the right or to the left, as will be more fully discussed, in order to eject conveyed material well over the side of the tractor.

As shown in Fig. 7, an elevational view taken from the front of the tractor, the conveyor mounted at the top of the supporting columns 28 and 30 includes a laterally slidable frame 40. Mounted at the ends of the frame are rotatable shafts 41 and 42, over which is trained an endless conveyor belt 43 driven respectively by sheaves 38 and 39. In order to more firmly engage the conveyed material, the smooth surface of the conveyor belt is interrupted by cleats or ridges 44. To facilitate sliding movement, the frame 40 is mounted between rollers 45 and 46 journaled on the upright brackets 48 and 50 secured to the supporting members 28 and 30. The conveyor is maintained in one or the other of the extreme positions by means of latch mechanisms 51 and 52 which have pawls 53 and 54 respectively. Pawl-engaging projections 56 mounted on the side of the sliding frame are engaged by the pawls to determine the extreme limits of movement of the sliding frame 40 and, as will be seen, serve to keep the appropriate one of a pair of driving belts taut.

Attached to the right end of the sliding frame is a hand rope 58, the other end of which is connected to the bracket 60. This rope is adapted to be pulled in order to urge the sliding frame into the left-hand position as illustrated. A hand rope 61 is similarly connected to the opposite end of the sliding frame to move the frame to the opposite position.

Instead of being connected directly to the bracket 60 shown, the ends of the hand ropes 58 and 61 may be passed once around a longitudinal drive shaft 70 and the free end of each rope terminated in a hand grip. It is obvious that by so doing the rotating shaft 70 may be made to serve as a winch. Simply tensioning the appropriate rope about the drive shaft by a manual pull would be effective to transport the conveyor frame from one extreme position to the other.

Before lateral movement of the movable frame can occur, however, it is necessary to apply force to the pendant 63 thereby to disengage the pawl 53 from the stop 56, the pendant 64 performing the equivalent function when the sliding frame is in the opposite extreme position.

Power is transmitted to the conveyor belt 43 with the frame in the position shown by means of a driving belt 66. An alternatively used belt 68 is provided for driving the conveyor belt with the frame 40 oppositely extended, the belt not in use being maintained in contact with its sheave by a retainer 62. It will be noted that the belt 68 has a single twist in order to drive the conveyor belt 43 in the opposite direction. The belts 66 and 68 are driven by a double sheave 69 mounted on a longitudinal shaft 70. Power is conveyed to the shaft 70 by means of the belt 71 driven by the power take-off pulley 72 (see Fig. 4) on the usual power take-off at the rear end of the tractor.

Attachment of the upper end of an elevator to the unit just described is accomplished by means of arms 73 pivoted on the conveyor frame. The remainder of the support afforded the elevator is provided by the lower links of the Ferguson hitch. It will be seen, particularly in the discussion concerning Figs. 2 and 3 which follows, that the elevator, regardless of whether the beets or the tops are being retrieved, is supported in such a manner that raising of the lower links may be employed to lift the lower end of the elevator clear of the ground. An additional member mounted on the tractor and adapted to engage the elevator is a yoke 74 which serves as a limit stop to limit the upward or downward movement of the elevator. A further function of the yoke in the controlling of the hydraulic lift mechanism will be discussed in connection with Fig. 3.

Topping unit

The topping mechanism indicated generally by the numeral 17 is shown generally in Fig. 2 and in greater detail in Figs. 4, 5 and 6. Two identical topping assemblies 78 and 79 act simultaneously to top the beets of two adjacent rows. Since the units are identical, a description of the unit 78 will suffice for both. As the discussion progresses, it will be seen that the apparatus 17 as a whole has three primary functions: The first is the establishing of an artificial reference plane from which the height of the crown of the beet may be measured; the second function is that of adjusting a topping knife with respect to the reference plane in accordance with certain principles to be described, and cutting the crown portion from the beet; and the third function is that of retrieving the beet tops.

The first function, that of establishing an artificial reference plane, has to do with the "midplane" defined above as the horizontal plane lying midway between the ridge top and the ditch bottom. The use of such midplane as a reference level in setting the topping knife averages out the vertical irregularities of the ditch and the ridge, thereby increasing the accuracy of the topping operation.

As the first step in obtaining an artificial reference plane or level, the beet topping mechanism as a whole is maintained in fixed vertical relationship with respect to the vehicle, it being assumed that the wheels of the vehicle run in the trenches or ditches between the beet rows. The basic supporting element of the structure is a horizontal tool bar 80 (Fig. 4). This tool bar is held in place vertically at a predetermined level with respect to the tractor by the draft links 20, 21 and 26. Brackets 81, 82 and 83 are rigidly connected to the bar 80, the bracket 81 being pivotally connected to the upper link 26 and the brackets 82 and 83 being connected side-by-side to the lower links 20 and 21 respectively. A check chain 25 may be used to limit the downward movement of the lower links 20 and 21.

In order to afford each beet topping mechanism a limited amount of lateral swing, an upstanding support 84 is connected rigidly to the horizontal bar 80. Mounted within the vertical support 84 is a shaft 85, the ends of which are journaled in rotatable sleeves 87 and 89. These sleeves serve to support cross members 91 and 92 respectively. Trailing from these cross members at the upper and lower ends of the support 84 are a pair of horizontal links or levers 88 and 90. The trailing ends of the links 88 and 90 are pivoted to a vertical link 93 which coacts therewith to complete a parallelogram 84, 88, 93, 90.

Suitable means may, if desired, be provided to bias the topper mechanism into alinement with the longitudinal axis of the vehicle. Thus a centering spring 95, which preferably takes the form of a leaf spring is fastened rigidly to the bracket 91 to engage a forked upstanding member 96 mounted on the horizontal bar 80. It will appear obvious that centering coil springs may be used, if desired.

Vertical positioning of the link 93 of the parallelogram 84, 88, 93, 90 is determined by L-shaped gauging runners 100 (Fig. 4). Movement of the latter causes the links 88, 90 to assume a corresponding angle of inclination thereby controlling the pivot level of the topping knife arm and finder arm. Such gauging runners are arranged to contact the ridge or crest of the beet row, holding the vertical link 93 at a level which is a function of the ridge level.

While the present embodiment uses runners for riding the ridge, other forms of ridge riding or feeling members may be used which accomplish the same function. Such members may, for example, consist of wheels, the axles of which may be fixed to the vertical link 93 for controlling the level thereof. Support for each gauging runner 100 is provided by the rigid extensions 102 of the link 93. The gauging runners are arranged in pairs which converge inwardly until at the trailing ends the separation is approximately equal to the diameter of a sugar beet of average, or slightly less than average, size.

In order to allow the gauging runners 100 to spread apart to allow passage of a larger than average beet, provision is made for a limited amount of swiveling about a vertical axis. Such swiveling is permitted by the mounting of each gauging runner 100 in a vertical sleeve 104 fixed at the end of the rigid extension 102. Outward movement of the gauging runners 100 is resiliently opposed by the compression springs 105 (Fig. 6) urging the arms 106 inwardly. In accordance with our invention, these gauging runners have two primary functions. One of these functions is to center the finding and cutting mechanism upon beets which may be located several inches from the center of the ridge, such centering being produced by swiveling of the mechanism about the shaft 85. The second function is to maintain pivot-supporting members 110 to which the knife arm and the finder arm are connected at a level which is proportional to a mean level (midplane) between the level of the ditch and that of the ridge. In the present embodiment, the pivot-supporting members 110 are rigidly fixed with respect to the horizontal links 88 and 90 of the parallelogram approximately at the center of such links. A transverse brace 86 interconnects the members 110 to insure that both sides of the parallelogram act as a unit.

Normally the weight of the topper assembly tends to press the gauging runners 100 into firm contact with the earth. In order that the downward unit pressure might not be too great, horizontal vanes 101 are fastened to the runners. In addition, part of the force is counterbalanced by a tension spring 113 anchored at diagonally opposite points 114 and 115 on the parallelogram linkage. The spring 113 is mounted as shown merely for purposes of convenience and, as a matter of fact, any anchoring points could be chosen which would have the effect of reducing the pressure between the gauging runners 100 and the earth.

The pivot-supporting members 110 carry two pivots 116 and 118. Trailing downwardly and rearwardly from the pivot 116 and engaged therewith is a finder arm 120 which carries at its lower end a finder disc 121. This disc is centered between the gauging runners 100 in the vicinity of the trailing tips of the runners. Forward movement of the topper mechanism causes rotation of the disc 121 about the pivot point 122; this rotation combined with the thin construction of the disc enables the latter to penetrate the foliage and contact the crown of each beet in the row.

Supported from the upper pivot 118 is a knife arm 123 having an upper portion 124 and a lower portion 125. Connection between the upper portion 124 and the lower portion 125 is effected by a knife arm clamping plate 126 having clamps 128 allowing adjustment of the lower portion 125 of the knife arm with respect to the upper portion. Downward movement of the knife arm about the pivot 118 is limited by a stop 130 adjustably mounted with respect to the vertical links 93. Movement of the knife arm 123 about the pivot 118 is controlled by the elevation of the finder disc 121 through the medium of the connecting link 131. Upward movement of either the knife arm or the finder arm is resisted by a spring 132 which tends to urge the knife arm 123 into contact with the adjustable stop 130.

Mounted at the lower end of the knife arm 123 is the topping knife indicated generally by the numeral 134. As shown in Fig. 6, the knife has a flat substantially horizontal blade 135 which preferably extends obliquely to the direction of motion of the topping mechanism. The elevation angle of the knife blade 135 for a given position of the knife arm may be adjusted within limits by the adjusting means 136.

The angle of the knife with respect to the direction of motion is shown in the drawings to be approximately 45°. Although this value has been found to produce a very satisfactory cutting action, it will be apparent to one skilled in the art that an angle greater or less than this amount may be used. The use of a knife having considerable width and mounted diagonally is accompanied by a number of advantages which have been found to be an important factor in the successful operation of a topper of our design.

We have found it desirable for accurate topping, for the knife blade to enter the beet at the instant that the finder reaches the high point of the crown. The factors to be considered in the design of the apparatus in order that this condition may obtain are outlined in detail later in the discussion. It would appear that as the finder disc is drawn beyond the crown of the beet, the resultant lowering of the disc would tend simultaneously to lower the knife. As a matter of fact, because of the wide angular blade and the horizontal application of the cutting force, the cut tends to remain at the initial level insted of proceeding downwardly at an angle, as would normally be expected. It can be readily demonstrated that the greater the angle of the knife with respect to the transverse axis of the vehicle, the greater the tendency for the knife to complete the cut at the initial level. An additional advantage of the angular placement of the knife may be termed the "slicing action" as contrasted with the "wedging action" peculiar to blades mounted transversely. It has been found that such angular orientation results in a decreased tendency to displace the beets during the cutting process and blades can be used for a longer period before resharpening becomes necessary. It will be noted, however, because of the accessibility of the baldes, that replacement or removal for re-sharpening can readily be accomplished.

It has been found that the lower leaves of the beet, especially those in contact with the earth, are limp and ropy rather than crisp and therefore have more of a tendency to interfere with proper operation of the topper than the leaves which are well clear of the ground. For this reason, it has been found desirable prior to the topping operation to cut the lower leaves from the beet ahead of any part of the mechanism that might become jammed with them. In the instant embodiment, this is accomplished by means of coulters 138 mounted on depending coulter brackets 140. While such coulters are shown as being placed so as to come rather closely adjacent to the outer sides of the beet in each pair of rows, other arrangements may be used as required.

In order to transversely stabilize the topping mechanism as a whole with respect to the tractor, a steering disc 142 is rigidly connected near the center of the horizontal bar 80 by means of the steering disc arm 144. As the topping mechanism is drawn forward, the steering disc rotates about a pivot 145 and penetrates the soil to a depth of several inches. A non-rotating rudder-like member may be used for this purpose, but a disc has proved to be advantageous in practice.

In order more fully to understand the relative movement of the knife and the finder which takes place as the topping mechanism strikes a beet, reference is made to Fig. 5. With the finder and the knife in the "at rest" position, the bottom or contact point of the finder disc 121 will descend to a point 150 which, as will later appear, is normally located on the midplane. Simultaneously the knife blade is caused to assume a position of rest at point 151 which is located a short distance below point 150. The vertical distance between points 150 and 151 may, for purposes of convenience, be called the "initial adjustment." As the topping device is drawn along a row of beets and the finder disc 121 engages a beet 152, the finder disc is swung upwardly about the pivot point 116 to point 153. At the same time, the level of the knife at the center line of the disc changes, due to the pivoting about point 118, moving to a new point 154. Thus it is seen that in the process of topping, the knife moves both vertically and horizontally with respect to the finder; and in order to produce a proper crown thickness for a given size of beet, it is necessary that both the vertical and the horizontal movements of the knife with respect to the point of contact of the finder follow accurately formulated relationships.

With regard to the vertical motion, it has already been pointed out that it is desirable under normal circumstances for the knife to rise one inch as the finder rises 1.4 inches. The "initial adjustment" or vertical distance between the finder and the knife when the finder is at the midplane (Fig. 11) has been found by experiment to be preferably .45 inch. While other "initial adjustments," for example, .75 inch, might be used under certain circumstances, the value of .45 inch will serve as a basis for obtaining sample design data.

Assuming that movement of the finder and knife starts from the "at rest" position, it will appear obvious that the crown thickness C. T. may be given by the following expression:

$$C.T. = .45 + \text{finder rise} - \text{knife rise}$$

If the finder rise is assumed to have a value H (the height of the crown of the beet above the midplane) and if the finder rise and knife rise are interrelated by the ratio 1.4:1 mentioned above, the expression for crown thickness becomes the following:

$$C.T. = .45 + .29H$$

Experiment has shown that the height of a beet above the midplane is equal to approximately .8 of the beet diameter D; thus the expression for the crown thickness may be given as:

$$C.T. = .45 + .23D$$

The last column in the table Fig. 10 gives various values of crown thickness as a function of the diameter which are obtainable using the above formulas. These values are used in determining the desired resultant path of the knife with respect to the finder.

Since it is necessary that the knife move horizontally with respect to the point of contact of the finder so that the knife may contact the beet at the instant that the finder is at the high point of the beet, it is necessary to consider three factors: The first factor is the radius R of the beet itself. The second factor, that of "lag," is a function of the angularity of the knife resulting in contact between the beet and the knife at a point spaced laterally from the center line of the beet. The third factor, termed "crown curvature advance," abbreviated to C. C. Adv., arises from the fact that the knife does not enter the beet at the level of greatest diameter but at a point of lesser diameter caused by the curvature of the beet crown. The combination of these three factors to determine the proper horizontal spacing or "gap" between the finder and the knife edge at the center line of the beet may be determined with reference to Fig. 9. It will be seen from the figure that the gap is equal to the radius R of the beet plus the "lag" due to the angularity of the knife minus the amount which it is necessary to advance the knife because of the curvature of the beet top. The expression for "gap" therefore becomes:

$$\text{Gap} = R + \text{Lag} - C.C. \text{Adv.}$$

The "lag" is found by drawing a tangent 160 at the angle of the knife (in this case 45°) from the outer diameter of the beet to the center line. For a beet having a two-inch radius, the "lag" can be shown, either mathematically or by construction, to be equal to .84 inch. In order to determine the "crown curvature advance," it is helpful to draw an outline 162 of the beet profile, the height H of the profile being fixed by the fact that the height is equal to eight-tenths of beet diameter. The "topping level" is determined by the crown thickness (which for a four-inch beet is equal to 1.37 inches), and a construction line 164 is drawn at this level. A perpendicular line 166 which is drawn from the intersection of the line 164 and the profile 162 determines the magnitude of the "crown curvature advance" along the center line, in this case approximately 0.1 inch. The expression for "gap," assuming a four-inch beet, therefore becomes:

$$\text{Gap} = 2 + .84 - 0.1 = 2.74 \text{ inches}$$

The table of Fig. 10 shows values for "gap" which have been worked out in the same manner for other diameters of beets. The way in which the data contained in the table of Fig. 10 may be utilized in the design of apparatus in accordance with our teachings is shown in Fig. 11. As a starting point in the design, a convenient length of finder arm 120 is chosen and a convenient location for the finder arm pivot 116 determined. Choice of these two factors determines an arc indicated in Fig. 11 between points 150 and 153. Starting at a level of zero elevation which in the practical embodiment is the midplane, equal increments of elevation are marked off. Since the height of a beet crown above the assumed zero level or midplane is eight-tenths of the maximum diameter of the beet, these increments of elevation are each made .8 inch. A point thus marked off on curve 150, 153 is the elevation to which the finder arm will rise for an average beet of the diameter indicated in the drawing.

It next becomes necessary to determine the location of the knife corresponding to each of the points marked off on the finder arm. For each point on finder arm curve, the knife will be located both downwardly and to the rear of the point of contact of the finder. The values of "gap" (see Fig. 10) corresponding to each beet diameter gives the horizontal displacement of the knife with respect to the finder while the values of crown thickness give the downward displacement of the knife with respect to the finder. There results, therefore, the curve of knife swing found between points 151 and 154 in Fig. 11. By using well known graphical methods it is possible to determine for practical purposes the length of the knife arm 123 and the location of the pivot 118 to produce the required arc of movement.

A connecting link 131 is positively attached to connection points 131a and 131b located intermediate the ends of the finder arm 120 and the knife arm 123 to cause the knife at all times to occupy a predetermined position with respect to the finder. The relation of this connecting link to each arm 120, 123 is in accordance with the required or desired ratio of knife movement to finder movement (see Fig. 11).

Beet top elevator

Subsequently to the topping operation, the beet tops are picked up from the ground and elevated to the conveyor by means of the elevator shown in Fig. 2 and indicated generally by the numeral 160. The elevator frame is composed of longitudinal members 162 and 163 at the ends of which are mounted an upper shaft 164 and a lower shaft 165. The weight of the elevator is borne by lower brackets 166 and 168 detachably connecting the longitudinal members 162 and 163 with the horizontal supporting bar 80, the brackets being longitudinally adjustable through such means as bolt and slot connections. Support at the other end is supplied by arms 73 which are pivoted on the conveying-supporting unit 15.

Mounted on the shaft 165 is a rotating cylinder 170 with radially projecting fingers 171. The cylinder is rotated by conveyor chains 172 and 173 driven by the upper shaft 164. The chains are interconnected at intervals by slats 175. Flexible extensions 176, which may be of leather or the like, bridge the spaces between the slats 175 to form an elevator apron. An elevator of this construction is particularly adapted to the elevating of beet tops since the flexible extensions 176 result in a whipping action at the top of the elevator and prevent the foliage from being wound about the lower shaft 165.

In operation, as the cylinder 170 rotates, the fingers 171 are caused to pass between the tines of a rake 177. This results in the depositing of the tops on the elevator apron and their subsequent depositing on the conveyor 31.

Fig. 8 shows the means used in the present instance for the transmission of power to the beet top elevator and conveyor. It will be noted that rotation of the shaft 70 driven by the power take-off sheave 72 causes rotation of a set of bevel gears 180 and, consequently, rotation of a transverse shaft 182. Power is transmitted from the shaft 182 to the elevating chains 172 and 173 via a first chain 183, an intermediate shaft 184 and a second chain 185. Adjustment of the speed of the elevator chain may be effected by choice of sprockets of the proper size mounted on the shaft 184.

While the operation of the beet topper and elevating mechanism will be clear from the foregoing, the operation will be briefly summarized as follows: As the tractor is driven along a beet row with its wheels in the furrows or ditches, the gauging runners 190 ride along the crest of the row. This maintains the pivot-supporting member 110 at an elevation which is proportional to the elevation of the midplane. The finder disc 121, which is centered upon the beet by the action of the gauging runners, engages the crowns of the beets and, as a result of the action of the linkage associating the knife and the finder disc, moves the knife 135 to the predetermined point of elevation and horizontal displacement. The severed tops are immediately thereafter picked up by the elevator, deposited upon the conveyor and ejected onto a vehicle traveling alongside the tractor.

Digging unit

Fig. 3 shows a digger and elevator constructed in accordance with our invention. The device is adapted to dig beets in two rows simultaneously and includes two duplicate sets of digger apparatus for accomplishing this function. Because of such duplication, only one perspective view of the device is necessary to understand the structure and operation; accordingly, only the assembly readily visible in Fig. 3 will be discussed.

The main supporting member for the digger and its associated elevator is the horizontal bar 200 suspended from the lower draft links 20 and 21 by means of the rigidly mounted tabs 201 and 202 respectively and connected to the upper link 26 by means of the vertical arm 203. At the ends of the bar 200 and rigidly affixed thereto are trailing extensions 204. Each of the latter serve to support the plow assembly supporting arm 206 by a pivotal connection 205 on the projecting portion 207 of the arm. A cross bar 209 which rigidly interconnects a supporting arm 206 on each side of the vehicle insures that both sets of digger apparatus are raised and lowered in unison.

Attached to the supporting cross bar 209 are vertical arms 210 which serve to support the co-operating plow blades 211 and 212. Trailing fingers 213 and 214, which are respectively associated with the plow blades, and the guiding fingers 216 guide the beets during rearward movement after they are removed from the earth. The plow blades 211 and 212 are normally lowered into the ground by reason of the lowering of the lower links 20 and 21 and, upon forward movement of the vehicle, engage a beet such as that shown at 152. Since the plow blades 211 and 212 taken together form a narrowing V-shaped notch, a beet is gradually pried out of the ground and onto the trailing fingers 213 and 214.

As the beets pass along the trailing fingers, they are engaged by a conveyor wheel 220 pivoted about a shaft 230 which, in the present embodiment, has a double row of radially-extending spikes 221. The conveyor wheel 220 is rotated at a peripheral speed which may be approximately equal to the forward speed of the vehicle. By reason of such rotation and the decreasing clearance between the trailing fingers and the conveyor wheel, the beets are forcibly impaled on the radially-extending spikes 221.

It will be noted that the effectiveness of the impaling just mentioned does not depend on the depth to which the plow blades 211 and 212 have been adjusted. Since both the plow assembly supporting arm 206 and the conveyor wheel 220 are mounted for rotation about the same shaft 230, the minimum clearance between the trailing fingers 213 and 214 and the wheel 220 remains constant for all plow levels.

After being carried approximately one-half a revolution by the conveyor wheel 220, the beets are engaged by the fingers 222 which are tangentially located with respect to the conveyor wheel and arranged gradually to disengage the beets from the spikes 221. As the beets are freed from the spikes 221, they are engaged by deflectors 223 which are curved inwardly, tending to urge the beets centrally into the hopper 227.

An elevator indicated generally by the numeral 229 removes the beets from the hopper. The elevator frame includes two longitudinal members 225 to which are fastened, at the upper and lower ends respectively, shafts 228 and 230. As previously noted, the lower shaft 230 serves as an axis of rotation for the conveyor wheel 220 and for the conveyor chain as well as serving as a point of pivotal support for the plow assembly supporting arms 206.

The raising of the beets in the elevator is effected by a movement of conveyor chains 234 and 235 driving cleats 236 fastened to the chains at intervals. The conveyor chains 234 and 235 are driven by the upper shaft 228 which is in turn driven by the belt 71, through the transverse shaft 182 and a chain 241. During the process of elevation, dirt is effectively removed from the beets by reason of their tumbling against a stationary lattice 242. The beets are prevented from being dislodged from the elevator by side guards 243 and 244 and are directed onto the conveyor 31 by the deflecting cover 246 attached near the upper end of the guards.

In order to cause rotation of the conveyor wheel 220 at the proper speed with respect to the chains of the elevator, it is necessary that a speed changing device be incorporated between the shaft 230 and the conveyor wheel. In the present embodiment, speed changing is accomplished by auxiliary sprocket wheels and chains. A first sprocket wheel 248 is rigidly coupled to the shaft 230. This sprocket wheel drives a first sprocket chain 250 which is in turn engaged with a second sprocket wheel 251. Mounted on the same shaft 252 as the second sprocket wheel is a smaller sprocket wheel 253 which drives a second sprocket chain 254. The latter engages a fourth sprocket wheel 255 which is engaged to and turns at the same speed as the conveyor wheel 220.

The conveyor wheel at the other side of the digger is driven by means of the shaft 252 through the medium of a similar sprocket wheel 253, a similar sprocket chain 254, and a similar sprocket wheel 255. These components, although hidden from view in Fig. 3, need not be shown, as their action is identical to the action of the correspondingly numbered parts observable in Fig. 3. Mechanical power therefore flows to the conveyor wheels 220 by the following route: power take-off 72, belt 71, shaft 182, chain 241, shaft 228, chains 234 and 235, shaft 230, sprocket 248, chain 250, shaft 252, sprockets 253, chains 254, sprockets 255.

The means for coupling the upper end of the beet elevator to the conveying-supporting structure is substantially the same as in the case of the beet top elevator in that the arms 247 attached to the members 225 are pivoted on the transverse shaft 182.

Because of the very light draft load involved in the use of the digger plows 211, 212 (Fig. 3), particularly under loose soil conditions, it is not feasible to control their depth of penetration by the conventional Ferguson System arrangement, in which the hydraulic lift on the tractor is caused to raise and lower the implement automatically to retain the draft load substantially constant. In other words, the draft loads involved may be too small to operate the spring 77 for any reasonable size of the latter. To overcome that difficulty, an actuating arrangement is provided for the automatic controls on the tractor which is operable at a position of the implement predetermined by adjustment rather than by the draft load on the implement. In brief, the arrangement is such that the downward vertical movement of the digger unit causes a portion of its weight to be applied through a leverage system to arbitrarily load the control spring 77 at a preselected period and thereby to stop further lowering. Thus, the lowermost limit of the unit, and of the digger plows in the soil, may be adjustably set.

As to the particular arrangement illustrated for applying force to the control spring 77, it will be seen upon inspection of Fig. 3 that the yoke 74 is connected to the longitudinal members 225 of the elevator by means of a coupling consisting of a pin 240 which bottoms in a cooperating slot 245. The yoke 74 terminates in a threadedly telescoping rod 74a which pivotally engages side extensions 75 on a rocker arm 76. The latter is rocked forward by loading on the yoke 74, when pin 240 bottoms in slot 245 to compress the control spring 77.

It will be obvious from Fig. 3 that inward movement of the yoke 74 and the rod 74a transmitting force to extensions 75, which provide considerable leverage, causes inward rotation of the rocker arm 76 and compression of the control spring 77. Lowering of the lower links, tool bar, plow blades and elevator and the concurrent inward movement of the rocker arm 76 will normally take place under the effect of gravity until the rocker arm is displaced sufficiently so as to cause the main control valve (not shown) of the hydraulic system to shift and prevent further dropping of the links. The point in the path of rotation of the rocker arm at which such valve movement takes place may be predetermined within limits by adjustment of the quadrant lever 24.

Likewise if the plows should for any reason be deflected upwardly, such upward movement would cause an outward swinging of the elevator, a removal of the force exerted by the weight of the elevator upon the control spring 77 and outward swinging of the rocker arm 76. Movement of the rocker arm outwardly beyond a predetermined point causes control valve of the hydraulic system to be shifted in such a manner as to cause the lower links to drop and the plows to penetrate more deeply. Thus it is seen that an equilibrium level of the lower links, plows, and elevator is established in which the rocker arm is partially displaced and the control spring partially compressed.

The above mechanism, producing a positioning control which effectively counteracts any extraneous forces tending to displace the digger plows from a preset depth, is set forth in greater detail in the copending sole application of Leon R. McRobert, Serial No. 743,186 filed April 22, 1947 as a division of the instant application and to which reference is made.

The linkages shown associated with the plow assembly are particularly well adapted for removing the plows from the earth as required for transportation. This is readily accomplished merely by throwing the quadrant lever 24 to raise the lower links 20 and 21 to an extreme upward position. Upward movement of the lower links 20 and 21 causes upward movement of the horizontal cross bar 200, upward movement of the plow assembly supporting arm 206 and the consequent movement of the plow assembly upwardly about the shaft 230 as a pivot to an out of the way position where the assembly is "tucked in" ahead of the then elevated conveyor wheel. The simultaneous upward rotation of the trailing fingers causes them to be clear of the ground and to present a protecting tapered surface to any exceptionally high obstructions encountered during transportation.

Although the operation of the beet digger will be apparent from the foregoing, the operation may be summarized as follows: As the digger is drawn forward, the plows 211 and 212 traveling below the surface at a predetermined level engage the lower wedge-shaped surface of a beet and exert a wedging or camming effect thereon to force the beet from the ground onto the trailing fingers 213 and 214. As the conveyor wheel 220 rotates at approximately ground speed, the spikes 221 are inserted into the beet and the beet is carried away from the trailing fingers and into contact with a pair of tangentially-extending fingers 222 which remove the beet from the spikes 221. Deflecting rods cause the beets to be directed into the hopper 227 from which they are removed by the cleats 236 of the elevator. During the upward movement, dirt is removed by the abrasive action of the lattice 242 and the beets are deposited on the belt 43 of the conveyor for disposal into an accompanying truck or similar vehicle alongside the tractor.

We claim as our invention:

1. In a beet topping device, a parallelogram linkage arranged for vertical movement and having vertical and horizontal members, a first vertical member adapted to be supported at a predetermined level with respect to the ditches between beet rows, a gauging member adapted to contact the ridge between adjacent ditches, a second vertical member associated with said gauging member, said second vertical member being disposed in spaced apart trailed relation with said first vertical member, horizontal links connecting said vertical members, pivot-supporting means connected to at least one of said horizontal links at a point between said vertical members, a finder arm to engage the crown of beets to be harvested, a knife arm utilized in the cutting of said beets connected in operative relation with respect to said finder arm, said finder arm and said knife arm being pivoted to said pivot-supporting means.

2. In a beet topper the combination comprising a finder arm having a finder at one end thereof, means for trailingly pivoting said finder arm on a tractor at its other end so that it is free to swing vertically as the finder is drawn along the tops of the beets in a row, a knife arm having a knife at one end thereof, means for trailingly pivoting said knife arm on a tractor at its other end for vertical swinging movement of the knife, and a linkage disposed in positively connected relation between connection points respectively located intermediate the ends of each of said arms, said connection points being so located that each increment of swing of the finder will be accompanied by a lesser increment of swing of the knife to adjust the latter to a predetermined cutting level with respect to the finder, said knife arm being pivoted at a point upwardly and rearwardly of the point of pivoting of said finder.

3. In a beet topper the combination comprising a finder arm having a finder at one end thereof, means for trailingly pivoting said finder arm on a tractor at its other end so that it is free to swing vertically as the finder is drawn along the tops of the beets in a row, a knife arm having a knife at one end thereof, means for trailingly pivoting said knife arm on a tractor at its other end for vertical swinging movement of the knife, said knife arm being pivoted at a point upwardly and rearwardly of the point of pivoting of said finder and having a greater radial length than the latter, and a rigid link interposed between pivotal connection points adjacent the midportions of said arms, said link connection points being located on said arms at radii such that the vertical displacement of the knife will be less than that of the finder and the rearward displacement of the knife will exceed that of the finder.

4. In a beet topper the combination comprising a finder arm having a finder at one end thereof, means for trailingly pivoting said finder arm on a tractor at its other end so that it is free to swing vertically as the finder is drawn along the tops of the beets in a row, a knife arm having a knife at one end thereof, means for trailingly pivoting said knife arm on a tractor at its other end at a point located upwardly and rearwardly of the finder pivot point for vertical swinging movement of the knife, the radial length of the knife arm being greater than the radial length of the finder arm, and a rigid link pivotally interconnecting the midportions of said arms so that a vertical swing of the finder will be accompanied by a corresponding vertical swing of the knife, the pivot points of said arms and said rigid connecting link defining a linkage wherein the horizontal gap between said finder and knife is susceptible of increasing progressively with beet size, said linkage being susceptible of effecting entry of the knife to take place when the finder is substantially centered on the crown of a beet.

5. In a beet topper the combination comprising a finder arm having a finder at one end thereof, means for trailingly pivoting said finder arm on a tractor at its other end so that it is free to swing vertically as the finder is drawn along the tops of the beets in a row, a knife arm having a knife at one end thereof, means for trailingly pivoting said knife arm on a tractor at its other end at a point located upwardly and rearwardly of the finder pivot point for vertical swinging movement of the knife, said knife arm being of greater length than said finder arm, and a link interconnecting the midportions of said arms so that the upward swing of the finder is accompanied by upward swing of the knife to adjust the latter to a predetermined cutting level, said link being shorter than the distance between the pivot points of said knife arm and said finder arm but connected at approximately the same radii on both of said arms so that the spacing between said finder and knife both horizontally and vertically increases progressively with the size of the beet.

6. In a beet topper the combination comprising a finder arm having a finder at one end thereof, means for trailingly pivoting said finder arm on a tractor at its other end so that it is free to swing vertically as the finder is drawn along the tops of the beets in a row, a knife arm having a knife at one end thereof, means for trailingly pivoting said knife arm on a tractor at its other end for vertical swinging movement of the knife, said knife arm having a greater radial dimension than said finder arm, the pivot point of said knife arm being located upwardly and rearwardly of the pivot point for said finder arm, a link of lesser length than the distance between the pivot points of said arms and disposed in pivotally attached relation with their midportions, said link being connected at such radii on said arms that movement of the same in response to increasing beet size will increase progressively the horizontal gap between said finder and knife enabling initial entry of the knife to take place when the finder is centered on the crown of a beet, said knife having a sharp leading edge and a relatively wide horizontal blade portion so that cutting is stably maintained at the level of initial entry.

7. In a beet topping device, the combination comprising a parallelogram linkage having a first generally vertical member, means for supporting said member at a predetermined level with respect to the ditches between beet rows, a second generally vertical member disposed in spaced-apart trailed relation with said first vertical member, and vertically spaced generally horizontal links connecting said vertical members, a finder to engage the crowns of beets to be harvested, a knife arm utilized in the cutting of the beets connected in operative relation with respect to said finder, pivotal supporting means for connecting said knife arm to said parallelogram linkage, and a gauging member connected to said linkage for contacting the ridge between adjacent ditches to adjust the height of said pivotal supporting means.

8. In a beet topping device, the combination comprising a finder arm to engage the crowns of beets to be harvested, a knife arm for severing the tops of said beets connected in operative relation with respect to said finder arm, vertically movable means pivotally supporting said arms, and means for supporting said vertically movable means including a first generally vertical member, means for supporting said first member at a predetermined level with respect to the ditches between beet rows, a second generally vertical member disposed in spaced-apart trailed relationship to said first member, vertically spaced generally horizontal links connected between said vertical members, and a gauging member associated with said second vertical member for contacting the ridge between adjacent ditches to adjust the height of said vertically movable means.

9. In a beet topping device for use with a tractor having laterally spaced trailingly pivoted lower links and a trailingly pivoted upper link, the combination comprising a finder arm to engage the crowns of beets to be harvested, a knife arm for severing the tops of said beets connected in operative relation with respect to said finder arm, vertically movable means for pivotally supporting said arms, and means for supporting said vertically movable means including a first generally vertical member, means for connecting said vertical member to the upper and lower links on the tractor to support said first member at a predetermined level with respect to the ditches between beet rows, a gauging member for contacting the ridge between adjacent ditches to adjust the height of said vertically movable means, a second generally vertical member associated with said gauging member and disposed in spaced-apart, trailed relation with said first member, and vertically spaced horizontal links connecting said first and second members.

NELSON E. REYNOLDS.
LEON R. McROBERT.

References Cited in the file of this patent

UNITED STATES PATENTS

| Number | Name | Date |
|---|---|---|
| 833,456 | Goodfellow | Oct. 16, 1906 |
| 873,040 | Goodfellow | Dec. 10, 1907 |
| 922,084 | Carroll | May 18, 1909 |
| 1,257,168 | Wilson | Feb. 19, 1918 |
| 1,282,657 | Tussing | Oct. 22, 1918 |
| 1,369,721 | Wilson | Feb. 22, 1921 |
| 1,533,672 | Stockstill | Apr. 14, 1925 |
| 1,585,727 | Leitch | May 25, 1926 |
| 1,592,859 | Leitch | July 20, 1926 |
| 2,184,422 | Graham | Dec. 26, 1939 |
| 2,214,949 | Zuckerman | Sept. 17, 1940 |
| 2,305,254 | Hirschkorn | Dec. 15, 1942 |
| 2,336,623 | Loucks | Dec. 14, 1943 |
| 2,337,698 | Walz | Dec. 28, 1943 |
| 2,350,173 | Loucks | May 30, 1944 |
| 2,369,850 | Powers | Feb. 20, 1945 |
| 2,404,629 | Griff | July 23, 1946 |
| 2,415,013 | Kubitz | Jan. 28, 1947 |
| 2,429,044 | Bassett | Oct. 14, 1947 |